United States Patent
Jäger

Patent Number: 5,268,474
Date of Patent: Dec. 7, 1993

[54] PROCESS FOR THE PREPARATION OF REACTIVE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 818,330

[22] Filed: Jan. 9, 1992

[30] Foreign Application Priority Data

Jan. 16, 1991 [DE] Fed. Rep. of Germany ....... 4101067

[51] Int. Cl.$^5$ .................. C09B 62/04; C09B 19/02; C07D 265/38
[52] U.S. Cl. ........................................ 544/76; 544/72; 544/74; 544/75
[58] Field of Search .................. 534/598; 544/72, 75, 544/76, 74

[56] References Cited

U.S. PATENT DOCUMENTS

| | | | |
|---|---|---|---|
| 4,400,504 | 8/1983 | Harms et al. | 544/75 X |
| 4,604,459 | 8/1986 | Jager | 544/76 |
| 4,665,179 | 5/1987 | Wunderlich et al. | 544/75 X |
| 4,933,446 | 6/1990 | Sawamoto et al. | 547/75 X |
| 5,003,053 | 3/1991 | Springer et al. | 584/598 |
| 5,122,605 | 6/1992 | Pedrazzi | 544/76 |

FOREIGN PATENT DOCUMENTS

| | | | |
|---|---|---|---|
| 0425907 | 5/1991 | European Pat. Off. | 544/76 |
| 0448815 | 10/1991 | European Pat. Off. | 544/76 |

Primary Examiner—Floyd D. Higel
Attorney, Agent, or Firm—Sprung Horn Kramer & Woods

[57] ABSTRACT

The invention relates to an improved process for the preparation of dyestuffs based on at least one triphendioxazine which is linked to a further chromophore via a triazine at a pH of 5.5 to 2.0 and a temperature of 50 to 100° C.

5 Claims, No Drawings

PROCESS FOR THE PREPARATION OF REACTIVE DYESTUFFS

The invention relates to a process for the preparation of reactive dyestuffs.

Triphendioxazine dyestuffs in which 2 chromophores are linked via a triazine ring are disclosed in US-A-4,005,551. The process for preparing them is needy of improvement.

The object of the present invention is to provide an improved preparation process.

The invention relates to a process for the preparation of dyestuffs of the formula

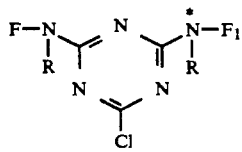
(I)

characterized in that a compound of the formula

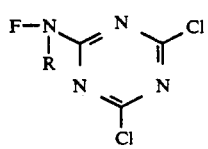
(II)

is condensed with a dyestuff of the formula

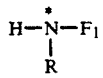
(III)

in aqueous medium and in a pH range from 5.5 to 2.0, in particular 5.0 to 2.5, and at a temperature of 50 to 100° C., in particular 70 to 80° C., to give a dyestuff (I), in which F denotes the radical of a triphendioxazine dyestuff, preferably F denotes

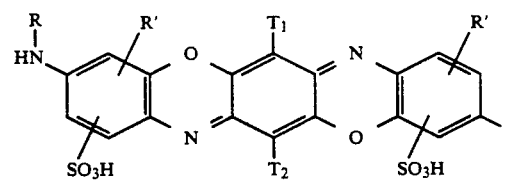
(IIIa)

R independently of one another denotes hydrogen, $C_1$-$C_4$-alkyl or substituted $C_1$-$C_4$-alkyl R' denotes hydrogen or a customary substituent of a triphendioxazine dyestuff, in particular halogen, alkyl, alkoxy, carboxyl $T_1$, $T_2$ denote hydrogen, chlorine, bromine, $C_1$-$C_4$-alkyl, $C_1$-$C_4$-alkoxy, phenyl or phenoxy, which may be substituted $F_1$ denotes the radical of a chromophore.

Examples of R are: $CH_3$, $C_2H_5$, n-$C_3H_7$, i-$C_3H_7$, n-$C_4H_9$, n-$C_6H_{13}$, which may be substituted, for example, by OH, $OCH_3$, $OC_2H_5$, COOH, $SO_3H$, $OSO_3H$, CN, Cl.

Examples of substituents of the optionally substituted $C_1$-$C_4$-alkyl and $C_1$-$C_4$-alkoxy radicals $T_1$ and $T_2$ are $C_1$-$C_4$-alkoxy or $OSO_3H$.

Examples of substituents of the optionally substituted phenyl and phenoxy radicals $T_1$ and $T_2$ are Cl, Br, $C_1$-$C_4$-alkyl, $C_1$-$C_4$-alkoxy and $SO_3H$.

Examples of suitable substituents R' are the following: halogen, such as Cl, $C_1$-$C_4$-alkyl, $C_1$-$C_4$-alkoxy, COOH.

The sulpho group in (IIIa) is in the opposition relative to the substituent

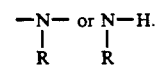

$F_1$ preferably denotes a chromophoric radical from the azo, formazan, anthraquinone, phthalocyanine or triphen-, dioxazine dyestuff series, in which the imino group

is bound directly to an aromatic-carbocyclic or aromatic-heterocyclic C atom in $F_1$.

Preference is given to the preparation of dyestuffs (I) in which R is hydrogen and $F_1$ denotes a radical F. Particular preference is given to the preparation of dyestuffs (I) in which $F_1$ is identical to F and in which R' represents hydrogen and $T_1$ and $T_2$ represents chlorine.

The dyestuffs (II) are obtained by a half-sided condensation of dyestuffs of the formula

F—H with cyanuric chloride, such as disclosed, for example, in DE-A-4,005,551, Example 1.

Dyestuffs of the formula (III) are known from the literature in large numbers.

Examples are:

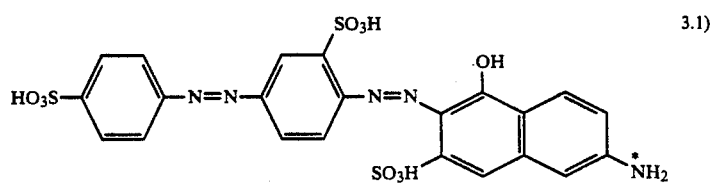
3.1)

-continued
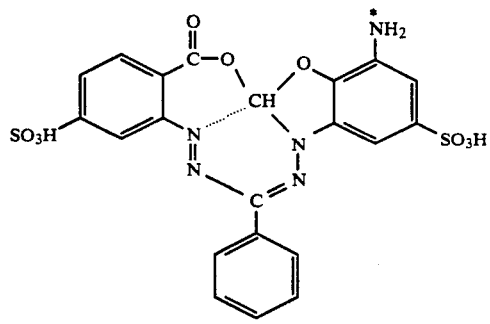
3.2)
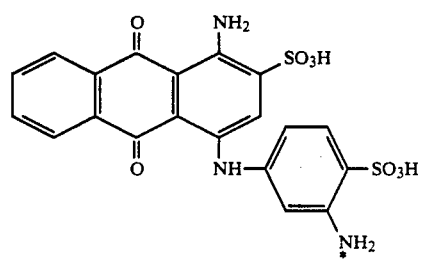
3.3)
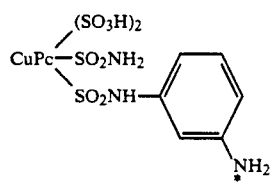
3.4)
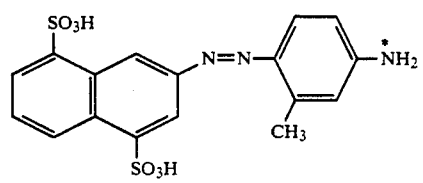
3.5)
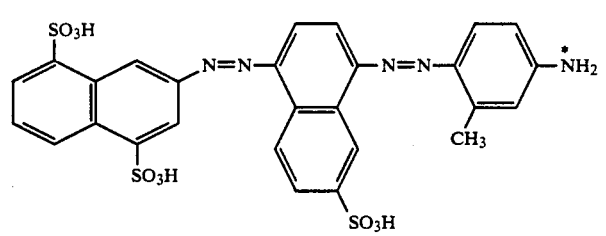
3.6)
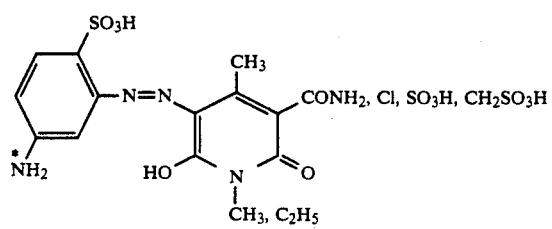
3.7)

-continued

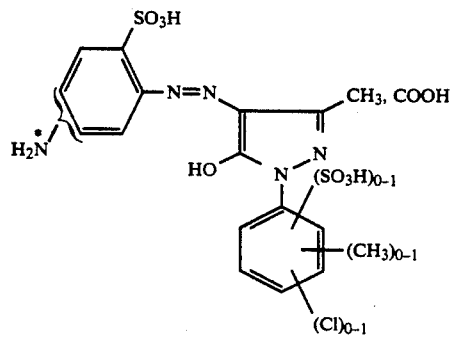
3.8)

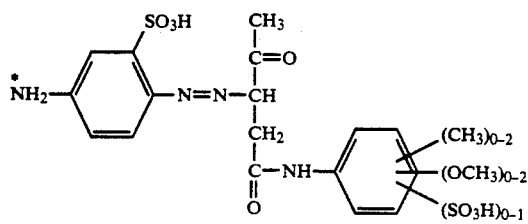
3.9)

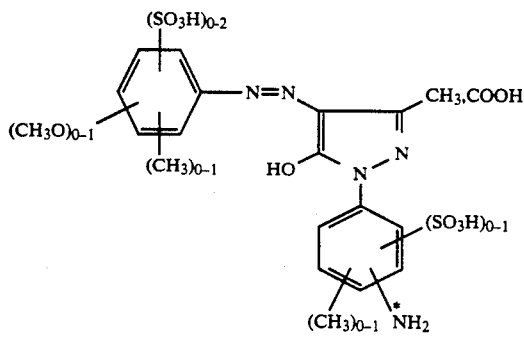
3.10)

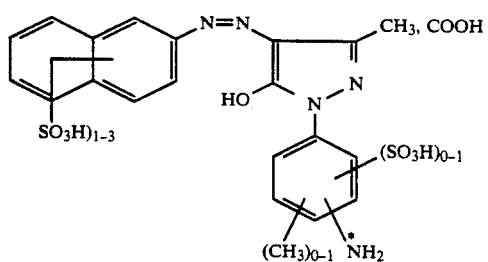
3.11)

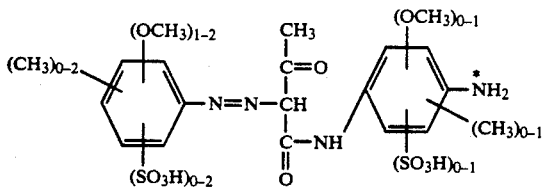
3.12)

The dyestuffs (II) are preferably used in the form of their lithium salts. Preferably, the reaction is carried out in the presence of a buffer suitable for the pH range from 2.0 to 5.5.

EXAMPLE 1

A neutral solution of the dilithium salt of 2,9-diamino-6,13-dichloro-triphendioxazine-disulphonic acid in 600 ml of water is added at room temperature to 0.05 mol of the di-lithium salt of the dyestuff of the formula

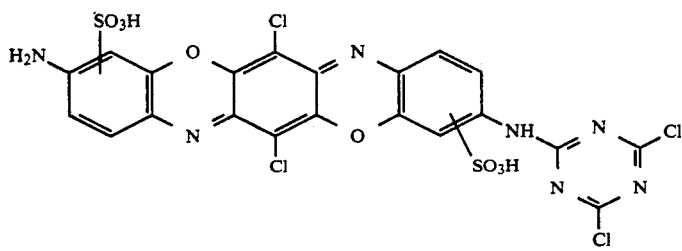

(obtainable by condensation of the di-lithium salt of 2,9-diamino-6,13-dichloro-triphendioxazine-disulphonic acid with cyanuric chloride in the presence of lithium hydroxide) present in 700 ml of water. The pH is brought to 5.0 with 2 ml of phosphoric acid, and the reaction mixture is then heated to 75° C. During condensation, the pH drops to about 2.5 to 3. After about 8 to 10 hours, the reaction is complete. The pH is then brought to pH 7 with lithium hydroxide solution. The dyestuff is precipitated by adding about 4% by volume of sodium chloride and can be isolated by filtering it off with suction.

In the form of the free acid, it has the formula

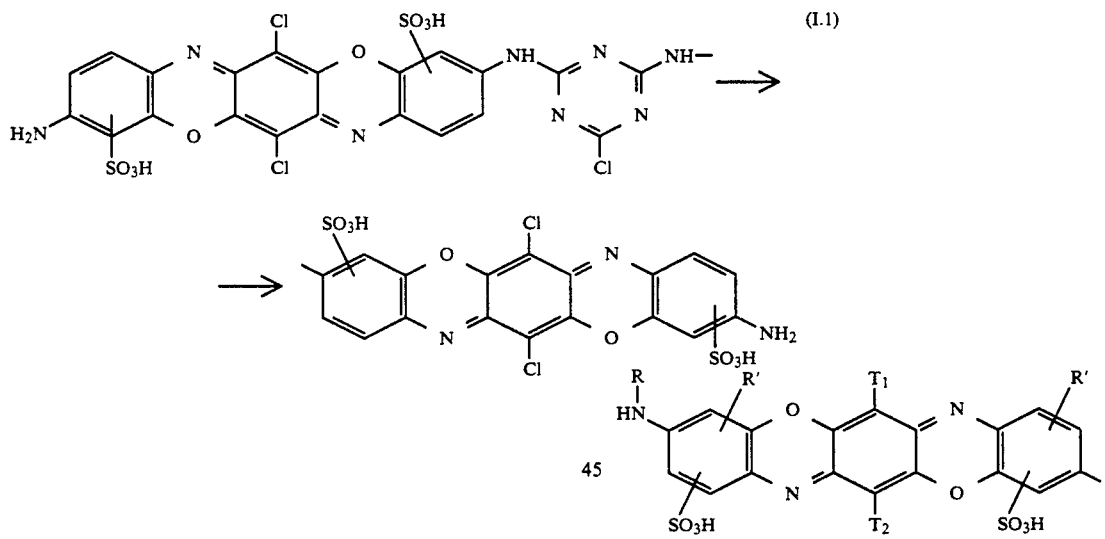

EXAMPLE 2

10 g of cyanuric chloride are added to 0.1 mol of 2,9-diamino-6,13-dichloro-triphendioxazine-disulphonic acid, which is dissolved in 1.3 l of ice water as the neutral di-lithium salt, and condensed in a pH range from 5 to 5.5, which is maintained by dropwise addition of dilute lithium hydroxide solution. After about 3 to 4 hours, 50% of the triphendioxazine dyestuff have been acylated on half a side. The mixture is heated to 72 to 74° C, during which the pH is allowed to drop to 3.5 and then maintained at 3.5 to 4.5 by adding dilute lithium hydroxide solution. After about 8 to 10 hours, condensation is complete. The mixture is brought to pH 7 and the dyestuff is salted out with 4 % by volume of sodium chloride. The dyestuff is identical to the product obtained according to Example 1.

I claim:
1. Process for the preparation of dyestuffs of the formula

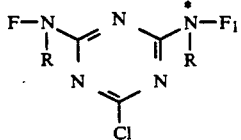

in which
F corresponds to the formula (IIIa)

wherein
R' denotes hydrogen or a customary substituent of a triphendioxazine dyestuff,
$T_1$ and $T_2$ denote hydrogen, chlorine, bromine, $C_1-C_4$-alkyl, $C_1-C_4$-alkoxy, phenyl, or phenoxy, which may be substituted,
R, independently of one another, denotes hydrogen, $C_1-C_4$-alkyl, or substituted $C_1-C_4$-alkyl, and
$F_1$ denotes the radical of a chromophore,
whereby a compound of the formula

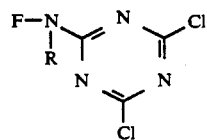

in the form of its lithium salt is condensed with a dyestuff of the formula:

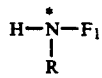

(III)

in aqueous medium and in a pH range from 5.5 to 2.0 and at a temperature of 50 to 100° C.

2. Process according to claim 1, characterized in that the reaction is carried out in the presence of a buffer.

3. Process according to claim 1, characterized in that R is $CH_3$, $C_2H_5$, n-$C_3H_7$, i-$C_3$-$H_7$, n-$C_4H_9$, n-$C_6H_{13}$, which may be substituted by OH, $OCH_3OC_2H_5$, COOH, $SO_3H$, $OSO_3H$, CN, Cl, R' is Cl, $C_1$-$C_4$-alkyl, $C_1$-$C_4$-alkoxy, COOH.

4. Process according to claim 1, characterized in that
R is H,
$F_1$ is F,
R' is H,
$T_1$, $T_2$ are Cl 5. Process according to claim 1, characterized in that the dyestuff in the form of the free acid has the following formula

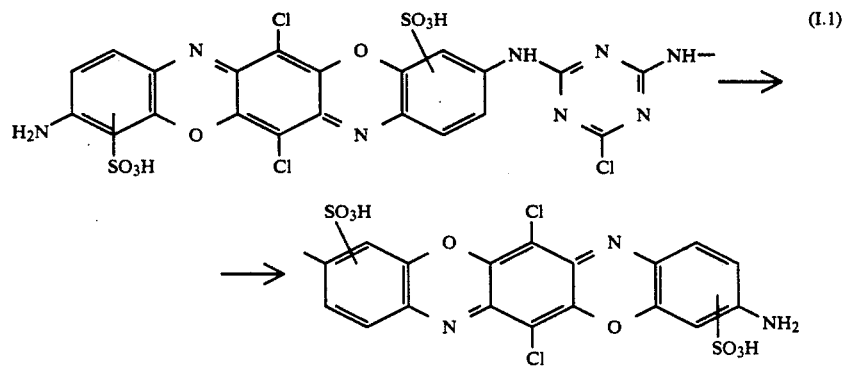

(I.1)

* * * * *